United States Patent
Lin

(10) Patent No.: US 10,861,643 B2
(45) Date of Patent: Dec. 8, 2020

(54) WIRELESS CHARGING STRUCTURE AND METHOD FOR FORMING THE SAME

(71) Applicant: ASUSTeK COMPUTER INC., Taipei (TW)

(72) Inventor: Bin-Yi Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 50 days.

(21) Appl. No.: 15/724,226

(22) Filed: Oct. 3, 2017

(65) Prior Publication Data

US 2018/0114634 A1 Apr. 26, 2018

(30) Foreign Application Priority Data

Oct. 20, 2016 (TW) .............................. 105133948 A

(51) Int. Cl.
| | | |
|---|---|---|
| H01F 38/14 | (2006.01) | |
| H01F 41/04 | (2006.01) | |
| H02J 7/02 | (2016.01) | |
| H02J 50/00 | (2016.01) | |
| H01F 27/36 | (2006.01) | |

(52) U.S. Cl.
CPC ............ *H01F 38/14* (2013.01); *H01F 27/36* (2013.01); *H01F 41/04* (2013.01); *H01F 41/041* (2013.01); *H02J 7/025* (2013.01); *H02J 50/00* (2016.02)

(58) Field of Classification Search
CPC .... H01F 38/14; H01F 27/365; H01F 27/2804; H01F 41/04; H01F 41/041; H01F 2017/0073; H01F 2017/008; H02J 7/025; H02J 50/00; H02J 5/00; B60L 53/12

USPC .... 336/200, 232, 84 C, 84 M; 320/108, 109; 307/104

See application file for complete search history.

(56) References Cited

U.S. PATENT DOCUMENTS

| | | | |
|---|---|---|---|
| 9,595,383 B2 | 3/2017 | Chien et al. | |
| 2009/0015362 A1* | 1/2009 | Okada ................ | H01F 27/2871 336/65 |
| 2009/0184679 A1* | 7/2009 | Yeh ..................... | H01F 27/2804 320/108 |
| 2013/0300352 A1* | 11/2013 | Kuk ....................... | H02J 50/10 320/108 |
| 2015/0123604 A1* | 5/2015 | Lee ......................... | H01F 38/14 320/108 |
| 2015/0288067 A1* | 10/2015 | Kwon ................. | H01Q 9/0407 320/108 |

(Continued)

FOREIGN PATENT DOCUMENTS

| | | |
|---|---|---|
| CN | 205247351 U | 5/2016 |
| EP | 2767972 | 8/2014 |

(Continued)

OTHER PUBLICATIONS

Office Action issued in corresponding Taiwan patent application dated Jan. 22, 2017.

*Primary Examiner* — Mang Tin Bik Lian
(74) *Attorney, Agent, or Firm* — McClure, Qualey & Rodack, LLP

(57) ABSTRACT

A wireless charging structure is provided. The wireless charging structure comprises: a substrate; a decorative layer disposed on the substrate; a metal coil disposed on the decorative layer; and a shield layer covering the metal coil. A method for forming a wireless charging structure is also provided.

7 Claims, 8 Drawing Sheets

(56) References Cited

U.S. PATENT DOCUMENTS

2015/0349578 A1* 12/2015 Hu .................. H02J 7/0042
                                                        320/108
2016/0081239 A1    3/2016 Lee et al.
2016/0322156 A1* 11/2016 Yeh .................. H02J 5/005

FOREIGN PATENT DOCUMENTS

| TW | 200737480 A | 10/2007 |
|----|-------------|---------|
| TW | 201509053 A | 3/2015  |
| TW | 201607909   | 3/2016  |
| TW | 201616525   | 5/2016  |

* cited by examiner

WIRELESS CHARGING STRUCTURE AND METHOD FOR FORMING THE SAME

CROSS-REFERENCE TO RELATED APPLICATION

This application claims the priority benefit of Taiwan application serial No. 105133948, filed on Oct. 20, 2016. The entirety of the above-mentioned patent application is hereby incorporated by references herein and made a part of specification.

BACKGROUND OF THE INVENTION

Field of the Invention

The disclosure relates to a non-contact charging coil structure and a method for forming the same.

Description of the Related Art

In recent years, with the rapid development of wireless charging technology, the wireless charging technology is widely used in electronic devices for wireless charging. The electromagnetic induction principle is applicable to the wireless charging technology. In detail, a primary coil at a power supply side is configured close to a secondary coil at a power receiving side. Then, the secondary coil is affected by the magnetic field from the primary coil to generate an induced current. As a result, a non-contact charging is made without relying on transmission wires to supply power.

However, a coil usually formed by winding around a coil winding machine which is complicated and time-consuming. The thickness of the formed coil that produced by the coil winding machine is also too thick. Hence, the coil would occupy a large interior space of the electronic device. As a result, the coil is not applicable to electronic devices which trend to be small and thin, such as a smart phone.

BRIEF SUMMARY OF THE INVENTION

According to a first aspect of the disclosure, a wireless charging structure is provided. The wireless charging structure comprises: a substrate; a decorative layer disposed on the substrate; a metal coil disposed on the decorative layer; and a shield layer covering the metal coil.

According to a second aspect of the disclosure, a wireless charging structure is provided. The wireless charging structure comprises: a substrate; a decorative layer disposed on the substrate; a shield layer disposed on the decorative layer; and a metal coil contacting with the shield layer.

According to a third aspect of the disclosure, a method for forming a wireless charging structure is provided. The method for forming a wireless charging structure comprises: forming a decorative layer on a substrate; and forming a metal coil on the decorative layer and then forming a shield layer to cover the metal coil, or forming the shield layer on the decorative layer and then forming the metal coil on the shield layer.

In embodiments, the structure of the wireless charging structure is simple. The method for forming the wireless charging structure is not complicated and is less time consuming, which improves the product yield.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
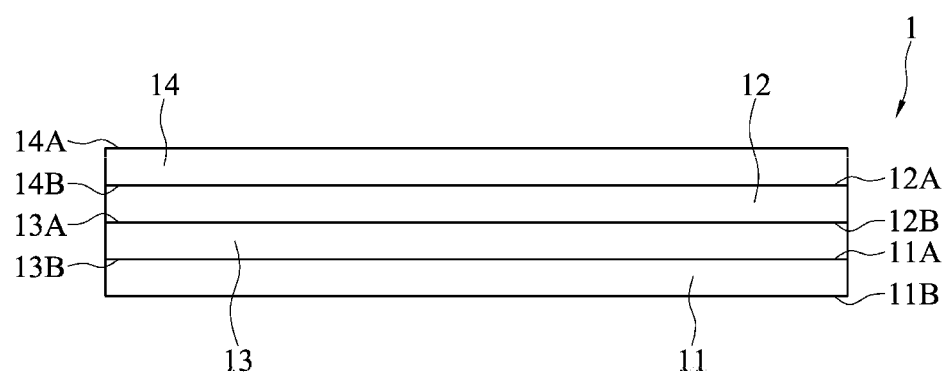
FIG. 1 is a side view of a wireless charging structure in an embodiment.

FIG. 1 is a side view of a wireless charging structure in an embodiment. Please refer to FIG. 1. In an embodiment, a wireless charging structure 1 includes a substrate 11, a decorative layer 13, a metal coil 12 and a shield layer 14. Each of the substrate 11, the decorative layer 13, the metal coil 12 and the shield layer 14 includes two opposite surfaces (for example, the two surfaces of the substrate 11 are a first surface 11A and a second surface 11B. The two surfaces of the decorative layer 13 are a first surface 13A and a second surface 13B. The two surfaces of the metal coil 12 are a first surface 12A and a second surface 12B. The two surfaces of the shield layer 14 are a first surface 14A and a second surface 14B).

The decorative layer 13 is formed on the first surface 11A of the substrate 11. The second surface 13B of the decorative layer 13 contacts with the first surface 11A of the substrate 11. With the configuration of the decorative layer 13, the appearance of the wireless charging structure 1 is variable with different colors, textures, or patterns. The metal coil 12 is formed on the first surface 13A of the decorative layer 13. The second surface 12B of the metal coil 12 contacts with the first surface 13A of the decorative layer 13. In an embodiment, the metal coil 12 is a cyclic type. The metal coil 12 is induced by a magnetic field to generate an induced current. The shield layer 14 is formed on the first surface 12A of the metal coil 12. The second surface 14B of the shield layer 14 covers the first surface 12A of the metal coil 12. In embodiments, the shield layer 14 is made of soft ferromagnetic materials, such as, manganese-zinc (Mn—Zn) ferrite materials or Ni—Zn ferrite materials. The shield layer 14 is used to reflect electromagnetic waves to enhance the magnetic field strength around the metal coil 12.

In an embodiment, the substrate 11 is a flexible substrate. The substrate 11 is made of plastic materials, such as, polyethylene terephthalate (PET), epoxypropane (PO) or polycarbonate (PC) materials. In an embodiment, the substrate 11 is made of glass or metal materials. In an embodiment, the metal coil 12 is made of conductive materials, such as one or a combination of cooper, silver, and graphene.

In forming the wireless charging structure 1, the decorative layer 13 is formed on the first surface 11A of the substrate 11 by using a printing method (such as a screen printing method or an ink printing method), or a decorating method (such as, an in-mold decoration method (IMD) or an out-mold decoration method (OMD)). Then, the metal coil 12 is formed on the first surface 13A of the decorative layer 13 by using the screen printing method or the ink printing method. In an embodiment, the metal coil 12 is formed by stamping a metal film via a mold by using a stamping method. The molded metal coil 12 is configured onto the first surface 13A of the decorative layer 13. Then, the shield layer 14 is formed on the metal coil 12.

Figure 2:
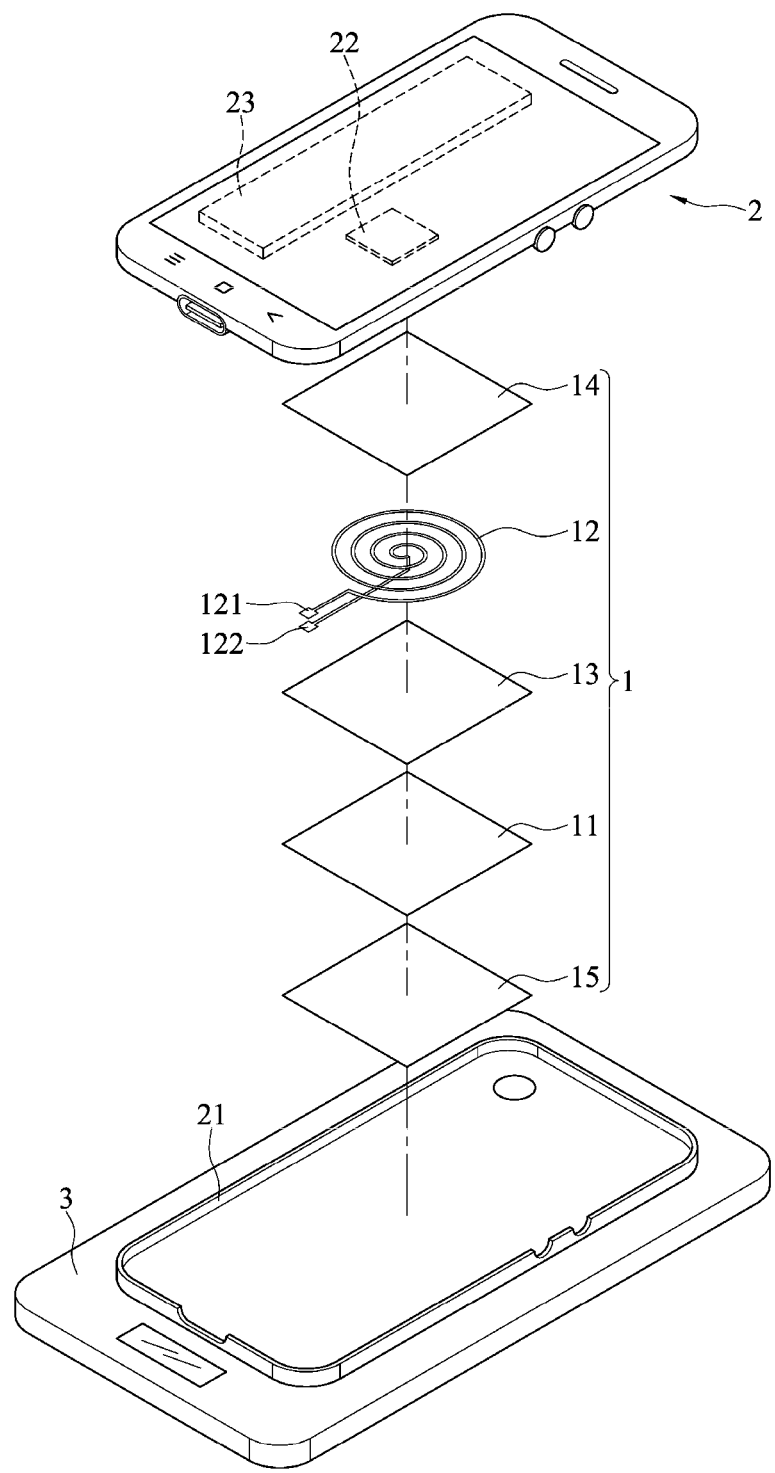
FIG. 2 is an exploded view showing the wireless charging structure in FIG. 1 is combined to an electronic device in an embodiment.
Figure 3:
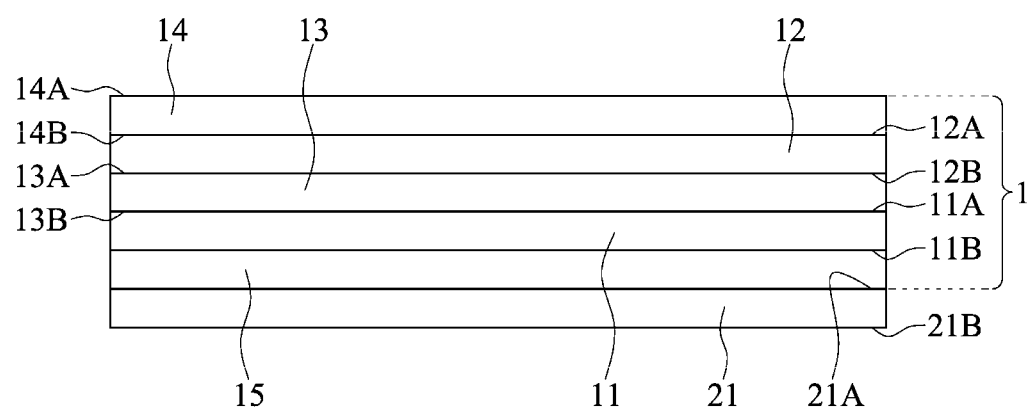
FIG. 3 is a side view showing the wireless charging structure in FIG. 2 is attached to a housing in an embodiment.

FIG. 2 is an exploded view showing the wireless charging structure in FIG. 1 is combined to an electronic device 2 in an embodiment. FIG. 3 is a side view showing the wireless charging structure 1 in FIG. 2 is attached to a housing 21 in an embodiment. In FIG. 2, the electronic device 2 is a smartphone, and the housing 21 is a back cover of the smartphone. In other embodiments, the electronic device 2 is a notebook computer, a tablet computer or a personal digital assistant.

Please refer to FIG. 2 and FIG. 3. In an embodiment, the wireless charging structure 1 is combined to the electronic device 2. The electronic device 2 includes the housing 21, a battery 23 and a circuit 22. In an embodiment, the material of the housing 21 is glass or plastic. In an embodiment, the battery 23 and the circuit 22 are configured in the housing 21. In the embodiment, the wireless charging structure 1 further includes an adhesion layer 15. The adhesion layer 15 is a reactive type, a hot-melt type, a solvent-type, an emulsion type or a pressure-sensitive type according to the type of the housing 21, which is not limited herein. As shown in FIG. 2 and FIG. 3, the adhesion layer 15 is disposed between an inner surface 21A of the housing 21 and the second surface 11B of the substrate 11. The adhesion layer 15 is attached between the second surface 11B of the substrate 11 and the inner surface 21A of the housing 21. Thus, the wireless charging structure 1 is attached to the housing 21. On the other hand, the metal coil 12 includes two pins 121 and 122. The battery 23 of the electronic device 2 is electrically connected to the two pins 121 and 122 of the metal coil 12. When the electronic device 2 is placed on a wireless charging dock 3, the metal coil 12 is affected by the magnetic field generated by the wireless charging dock 3 to generate the induced current. The induced current flows to the battery 23 via the two pins 121 and 122. The battery 23 is charged to provide the power to the circuit 22. In the embodiment, the shield layer 14 is disposed between the metal coil 12 and the circuit 22 to prevent the mutual interference between the metal coil 12 and the circuit 22.

In an embodiment, a surface of the housing 21 of the electronic device 2 is coated with a decorative layer. The decorative layer of the housing 21 and the decorative layer 13 have the same appearances. That is, the appearances of the housing 21 and the wireless charging structure 1 are consistent. In an embodiment, the decorative layer 13 and the decorative layer of the housing 21 have different appearances to make the wireless charging structure 1 notable.

Figure 4:
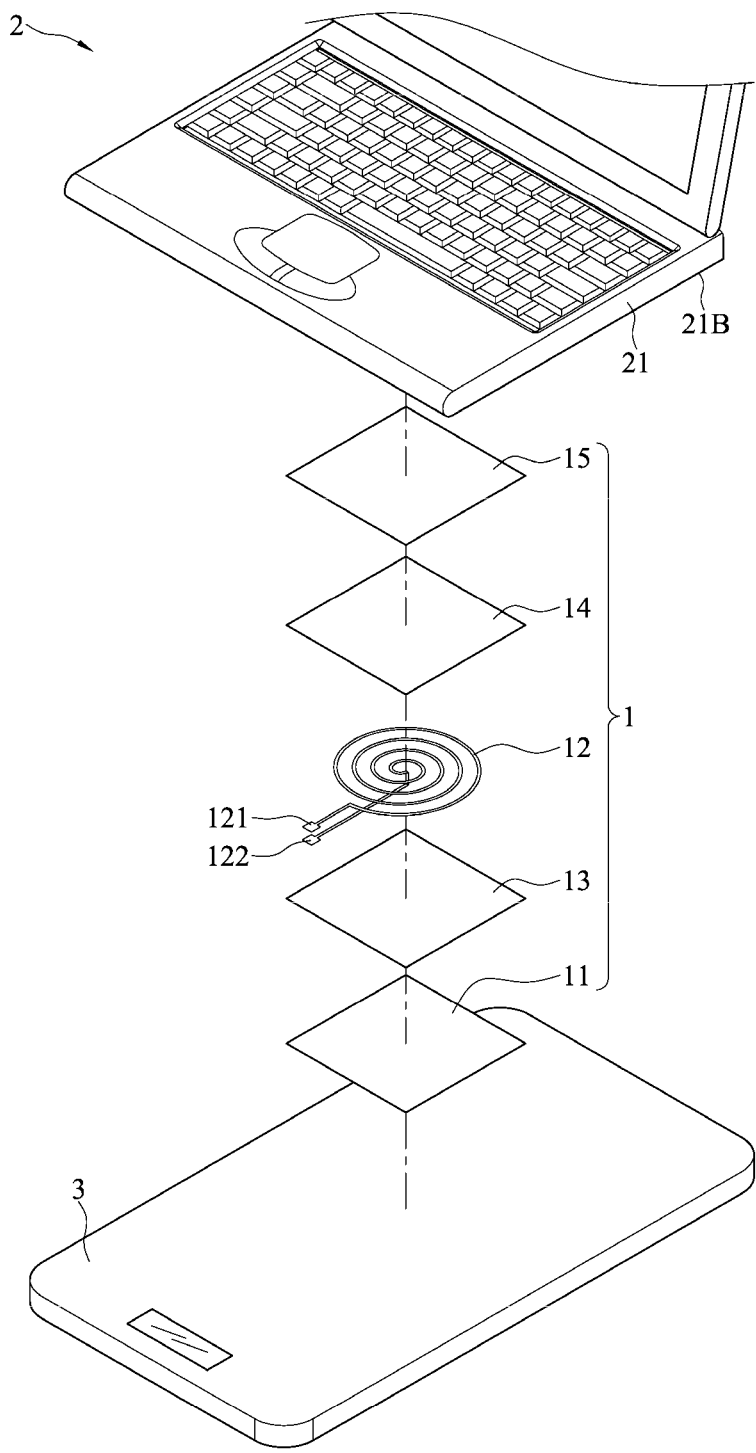
FIG. 4 is an exploded view showing the wireless charging structure in FIG. 1 is combined to an electronic device in an embodiment.
Figure 5:
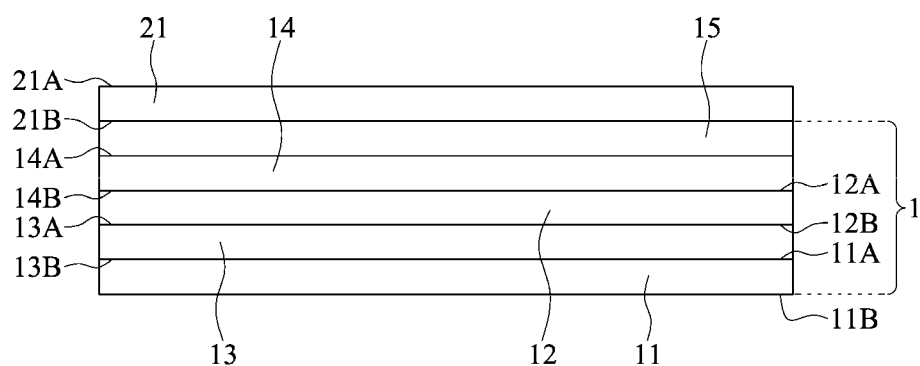
FIG. 5 is a side view showing the wireless charging structure in FIG. 4 is attached to a housing in an embodiment.

FIG. 4 is an exploded view showing the wireless charging structure in FIG. 1 is combined to an electronic device 2 in an embodiment. FIG. 5 is a side view showing the wireless charging structure 1 in FIG. 4 is attached to a housing 21 in an embodiment. In FIG. 4, the electronic device 2 is a notebook computer. Please refer to FIG. 4 and FIG. 5. The wireless charging structure 1 is attached to an outer surface 21B of the housing 21 of the electronic device 2. The outer surface 21B faces towards a user of the wireless charging dock 3 or a user of the electronic device 2. As shown in FIG. 4 and FIG. 5, the adhesion layer 15 is disposed between the first surface 14A of the shield layer 14 and the outer surface 21B of the housing 21. The adhesion layer 15 is attached between the outer surface 21B of the housing 21 and the first surface 14A of the shield layer 14 to combine the wireless charging structure 1 to the housing 21. In the embodiment, when the electronic device 2 is placed on the wireless charging dock 3, the metal coil 12 is affected by the magnetic field generated by the wireless charging dock 3 to generate the induced current to provide the power to the notebook computer. In the embodiment, the shield layer 14 is formed between the circuit 22 and the metal coil 12 to prevent the mutual interference between the metal coil 12 and the notebook computer.

Figure 6:
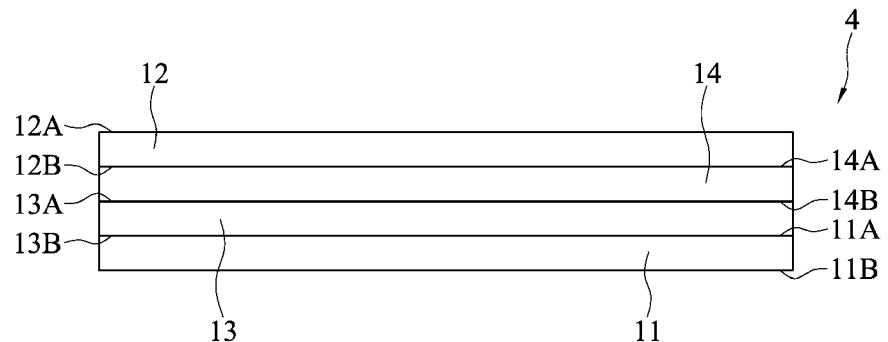
FIG. 6 is a side view of a wireless charging structure in an embodiment.

FIG. 6 is a side view of a wireless charging structure in an embodiment.

Please refer to FIG. 6. In the embodiment, the shield layer 14 is disposed on the decorative layer 13 and the metal coil 12 is disposed on the shield layer 14. The second surface 12B of the metal coil 12 contacts the first surface 14A of the shield layer 14. The second surface 14B of the shield layer 14 contacts the first surface 13A of the decorative layer 13. In forming the wireless charging structure 4, after the decorative layer 13 is formed on the substrate 11, the shield layer 14 is formed on the decorative layer 13. Then, the metal coil 12 is formed on the shield layer 14 by using the printing method or the stamping method.

Figure 7:
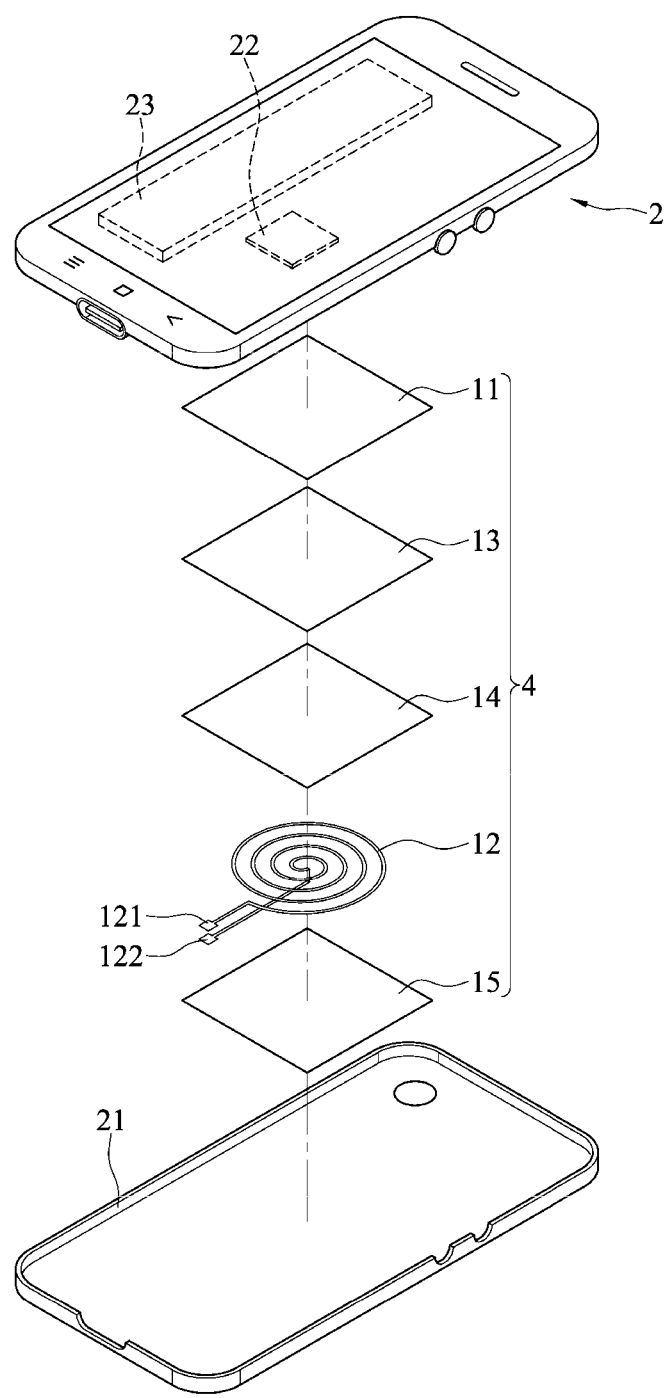
FIG. 7 is an exploded view showing the wireless charging structure in FIG. 6 is combined to an electronic device in an embodiment.
Figure 8:
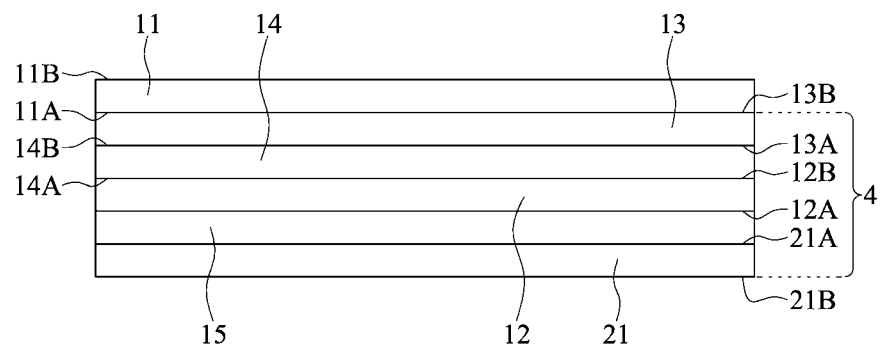
FIG. 8 is a side view showing the wireless charging structure in FIG. 7 is attached to a housing in an embodiment.

FIG. 7 is an exploded view showing the wireless charging structure in FIG. 6 is combined to an electronic device 2 in an embodiment. FIG. 8 is a side view showing the wireless charging structure 1 in FIG. 7 is attached to a housing 21 in an embodiment. Please refer to FIG. 7 and FIG. 8. In an embodiment, the wireless charging structure 4 further includes the adhesion layer 15. The wireless charging structure 4 is attached to the inner surface 21A of the housing 21 via the adhesion layer 15. As shown in FIG. 7 and FIG. 8, the adhesion layer 15 is disposed between the first surface 12A of the metal coil 12 and the inner surface 21A of the housing 21. The adhesion layer 15 is attached between the first surface 12A of the metal coil 12 and the inner surface 21A of the housing 21 to combine the wireless charging structure 4 to the housing 21. In the embodiment, the shield layer 14 is also disposed between the metal coil 12 and the circuit 22 to prevent the mutual interference between the metal coil 12 and the circuit 22.

Figure 9:
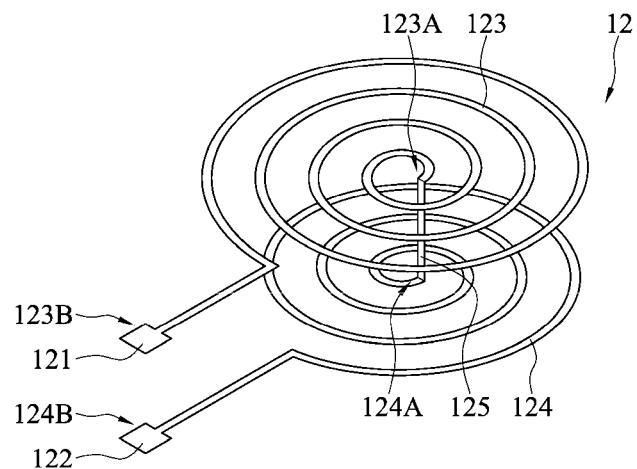
FIG. 9 is a schematic diagram showing a metal coil in an embodiment.

FIG. 9 is a schematic diagram showing a metal coil 12 in an embodiment. Please refer to FIG. 9. In the embodiments, to improve the power supply efficiency of the metal coil 12, the metal coil 12 includes two cyclic portions (a first cyclic portion 123 and a second cyclic portion 124) and a connecting portion 125. The first cyclic portion 123 is parallel to the second cyclic portion 124. The first cyclic portion 123 and the second cyclic portion 124 are not coplanar. Taking an X-axis, a Y-axis and a Z-axis of a Cartesian coordinate for example, the first cyclic portion 123 and the second cyclic portion 124 lie on two different X-Y planes, respectively. The connecting portion 125 is connected to a first end 123A of the first cyclic portion 123 and a first end 124A of the second cyclic portion 124. The connecting portion 125 extends along the Z-axis. In the embodiment, the second end 123B of the first cyclic portion 123 and the second end 124B of the second cyclic portion 124 are served as the pins 121 and 122. The induced current generated by the second cyclic portion 124 flows to the first cyclic portion 123 through the connecting portion 125. Then, the induced current generated by the second cyclic portion 124 is output via the pin 121. Alternatively, the induced current generated by the first cyclic portion 123 flows to the second cyclic portion 124 via the connecting portion 125. Then, the induced current generated by the first cyclic portion 123 is output via the pin 122.

Figure 10A:
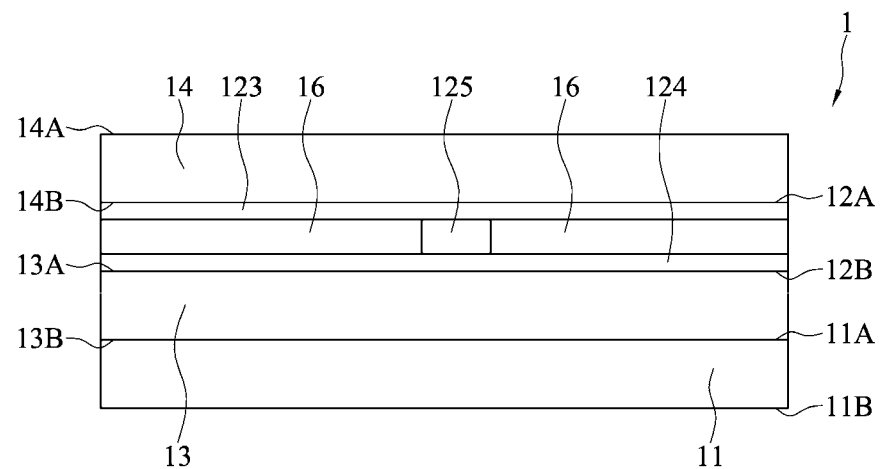
FIG. 10A is a schematic diagram showing the metal coil in FIG. 9 is used in the wireless charging structure in FIG. 1 in an embodiment.

Please refer to FIG. 10A. When the metal coil 12 in FIG. 9 is applied in the wireless charging structure 1, the second surface 14B of the shield layer 14 covers an upper surface (that is the first surface 12A) of the first cyclic portion 123. The bottom surface (that is the second surface 12B) of the second cyclic portion 124 contacts with the first surface 13A of the decorative layer 13. In the embodiment, the wireless charging structure 1 further includes an insulation layer 16. The insulation layer 16 is formed around the connecting portion 125. The insulation layer 16 is formed between the first cyclic portion 123 and the second cyclic portion 124 to contact the surface of the first cyclic portion 123 and the surface of the second cyclic portion 124. The first cyclic portion 123 and the second cyclic portion 124 are separated by the insulation layer 16. In forming the wireless charging structure 1 in FIG. 10A, the second cyclic portion 124 is formed on the first surface 13A of the decorative layer 13. The second cyclic portion 124 includes a connecting end (that is, the first end 124A). Then, the complete insulation layer 16 is formed on the surface of the second cyclic portion 124. An opening is formed adjacent to the first end 124A of the second cyclic portion 124 in the insulation layer 16 to form the discontinuous insulation layer 16. The first end 124A of the second cyclic portion 124 is exposed (from the opening). Then, metal materials for the metal coil 12 are filled in the opening to form the connecting portion 125. An end of the connecting portion 125 is connected to the first end 124A of the second cyclic portion 124. Then, the first cyclic portion 123 is formed on the insulation layer 16. The first end 123A of the first cyclic portion 123 is connected to the other end of the connecting portion 125.

Figure 10B:
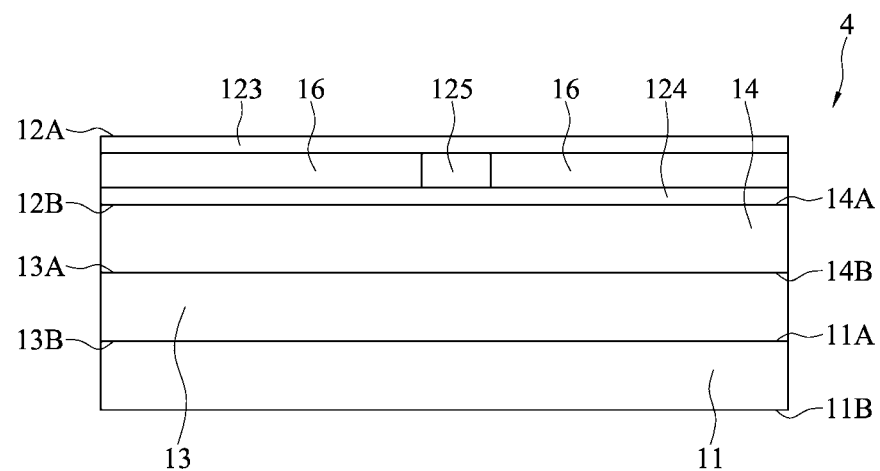
FIG. 10B is a schematic diagram showing the metal coil in FIG. 9 is used in the wireless charging structure in FIG. 6 in an embodiment.

Please refer to FIG. 10B. When the metal coil 12 in FIG. 9 is applied in the wireless charging structure 4 in FIG. 6, the bottom surface (that is the second surface 12B) of the second cyclic portion 124 contacts with the upper surface of the shield layer 14. The first cyclic portion 123 is combined with the housing 21 via the adhesion layer 15 attached to the upper surface (that is the first surface 12A) of the first cyclic portion 123. Different from the process of forming of the wireless charging structure 1, in forming the wireless charging structure 4 in FIG. 10, the second cyclic portion 124 is formed on the first surface 14A of the shield layer 14.

In an embodiment, the metal coil 12 is made of graphene materials. The maximum current density and tensile strength (TS) of the graphene is 100 times of that of the copper. The thermal conductivity of the graphene is 10 times of that of the copper. The mean free path of the graphene is 25 times of that of the copper. Therefore, with the same power supply efficiency, the metal coil 12 made of the graphene is light and thin. As a result, the thickness of the wireless charging structure 1 or 4 is in a range of 0.2 mm to 0.5 mm.

In sum, the structure of the wireless charging structure is simple. The method for forming the wireless charging structure is not complicated and is less time consuming, which improves the product yield. Furthermore, with the metal coil 12 that is made of the graphene, the thickness of the wireless charging structure is in the range of 0.2 mm to 0.5 mm, which is light and thin.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A wireless charging structure for attaching to an outer surface of a housing of an electronic device, comprising:
    a substrate;
    a decorative layer disposed on the substrate for affecting an variable appearance of the wireless charging structure with different colors, textures, or patterns;
    a metal coil disposed on the decorative layer;
    a shield layer disposed between the outer surface and the metal coil, and covering the metal coil, the shield layer directly contacting the metal coil; and
    an adhesion layer disposed between the outer surface and the shield layer, and directly contacting the outer surface and the shield layer.

2. The wireless charging structure according to claim 1, wherein the substrate includes a first surface and a second surface that are opposite to each other, the decorative layer contacts with the first surface, and the adhesion layer is attached to the second surface or the shield layer.

3. The wireless charging structure according to claim 1, wherein the wireless charging structure includes an insulation layer, and the metal coil includes:
    a first cyclic portion;
    a second cyclic portion parallel to the first cyclic portion, wherein the second cyclic portion and the first cyclic portion are not coplanar; and
    a connecting portion connecting an end of the first cyclic portion and an end of the second cyclic portion;
    wherein the insulation layer is deposed around the connecting portion, the insulation layer is deposed between the first cyclic portion and the second cyclic portion, the insulation layer is configured to contact with a surface of the first cyclic portion and a surface of the second cyclic portion.

4. The wireless charging structure according to claim 1, wherein the metal coil is made of graphene, and a total thickness of the substrate, the decorative layer, the shield layer and the metal coil is between 0.2 mm to 0.5 mm.

5. A wireless charging structure for attaching to an outer surface of a housing of an electronic device, comprising:
    a substrate;
    a decorative layer disposed on the substrate for affecting an variable appearance of the wireless charging structure with different colors, textures, or patterns;
    a shield layer disposed on the decorative layer;
    a metal coil directly contacting with the shield layer; and
    an adhesion layer disposed between the outer surface and the shield layer, and directly contacting the outer surface and the shield layer.

6. The wireless charging structure according to claim 5, wherein the wireless charging structure includes an insulation layer, and the metal coil includes:
    a first cyclic portion;

a second cyclic portion parallel to the first cyclic portion, wherein the second cyclic portion and the first cyclic portion are not coplanar; and a connecting portion connecting an end of the first cyclic portion and an end of the second cyclic portion;

wherein the insulation layer is deposed around the connecting portion, the insulation layer is deposed between the first cyclic portion and the second cyclic portion, the insulation layer is configured to contact with a surface of the first cyclic portion and a surface of the second cyclic portion.

7. The wireless charging structure according to claim 5, wherein the metal coil is made of graphene, and a total thickness of the substrate, the decorative layer, the shield layer and the metal coil is between 0.2 mm to 0.5 mm.

* * * * *